Patented Feb. 24, 1948

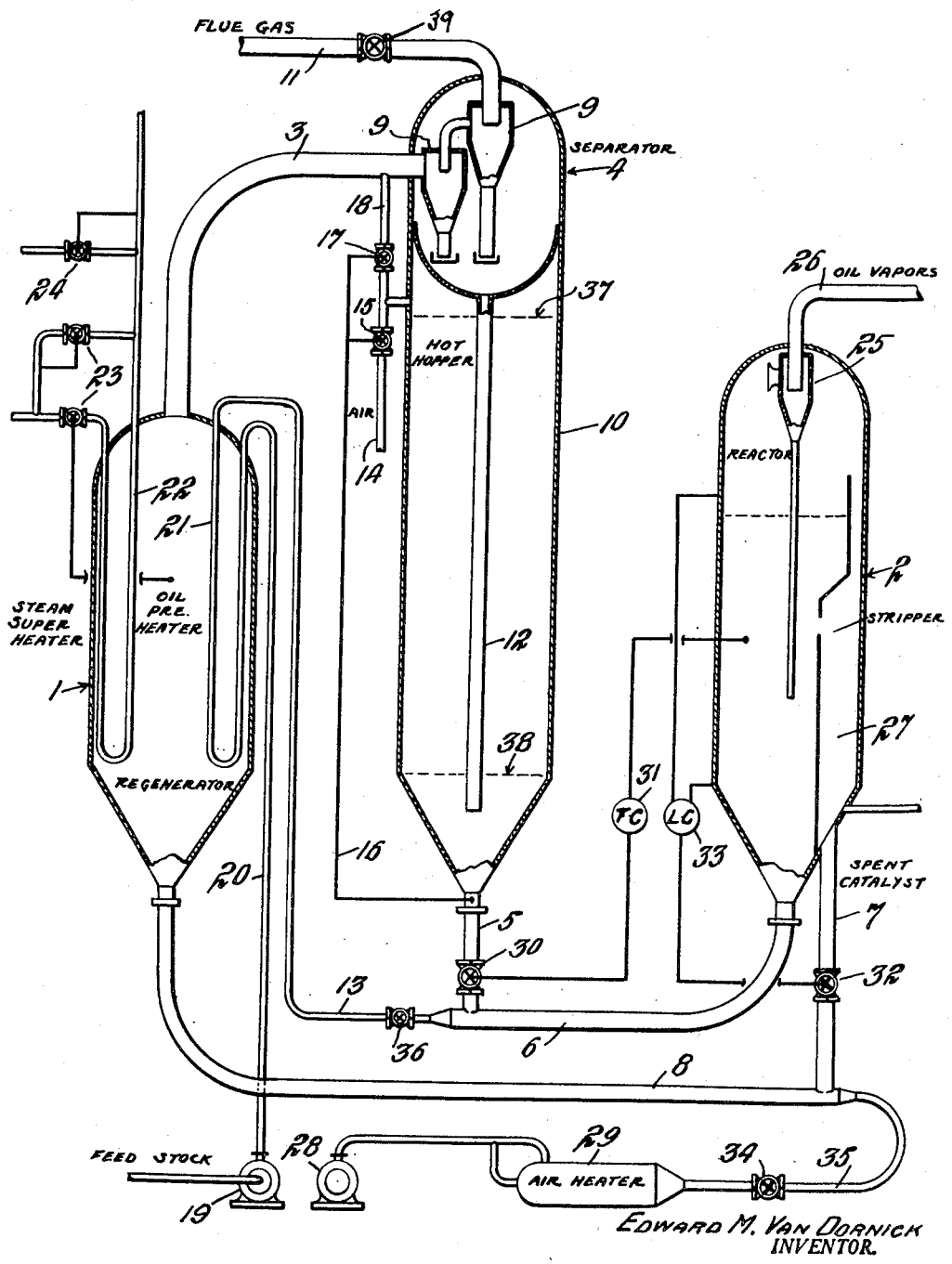

2,436,464

UNITED STATES PATENT OFFICE 2,436,464

FLUID CATALYTIC CRACKING

Edward M. Van Dornick, New York, N. Y.

Application June 4, 1946, Serial No. 674,196

3 Claims. (Cl. 196—52)

1

The invention here disclosed relates to fluid catalytic cracking operations.

Objects of the invention are to simplify and to generally improve operations of this character.

Special objects of the invention are to effect reductions in size and cost of necessary equipment, to render unnecessary and eliminate auxiliary equipment heretofore considered necessary and to combine essential parts in a compact, closely coupled unit capable of being effectively controlled for maintaining smooth, continuous operation.

Other special objects of the invention are to accomplish reduction in the necessary catalyst to oil ratios and to reduce the amount of necessary catalyst in the system and the quantity required for makeup purposes.

Other, related objects are to enable the catalyst being retained and held in the system and thus to shorten the time required for shutdown and startup operations.

Further special objects are to avoid waste of heat in the catalyst regeneration stage and to utilize excess heat usually present, for preheating the feed stock and superheating steam required in the system.

Other desirable objects and the novel features of construction and operation through which the purposes of the invention are attained, are set forth or will appear in the course of the following specification.

The drawing accompanying and forming part of the specification illustrates a present practical embodiment of the invention. Structural and operational features, however, may be modified and changed in various ways as regards the present illustration, all within the true intent and broad scope of the invention as hereinafter defined and claimed.

The single figure in the drawing is a simplified form of flow sheet illustrating one practical commercial embodiment of the invention.

As indicated in the diagram, the invention involves the combination of an upflow regenerator 1, a bottom drawoff reactor 2, upwardly extending fluid catalyst flow connections 3 from the top of the regenerator to a flue gas-catalyst separator 4, a hot regenerated catalyst supply connection 5 to a fluid catalyst mixing line 6 into which the feed oil is injected and vaporized and which enters the bottom of the reactor, and a bottom drawoff 7 from the reactor for spent catalyst, opening into a spent catalyst riser line 8 leading into the bottom of the regenerator.

2

The flue gas-catalyst separator is indicated as made up of two stages of cyclones 9 located in the top of a hot hopper 10, provided with a flue gas outlet 11.

A standpipe 12 extending from the separator section down into the lower portion of the hot hopper provides the necessary head for delivery of regenerated hot catalyst into the hot hopper which is maintained under pressure as required to discharge the catalyst through connection 5 into contact with the feed stock delivered through a supply line 13 into the reactor feed line 6.

The necessary pressure in the hot hopper is supplied, in the illustration, from an air line 14 regulated by a pressure control valve 15 which is actuated through line 16 from the base of the hot hopper. A second pressure control valve 17 is shown discharging at 18 into the regenerated catalyst flow line 3 to serve in cooperation with the first mentioned valve to maintain the desired pressure on the catalyst in line 5.

The feed to the reaction zone is preheated prior to admixture with the hot catalyst, by pumping the same at 19, through line 20, into a preheating coil 21 located in the regenerator and connected with the feed line 13.

Flow through this heating coil is regulated to effect the extraction of an amount of heat which is less than that available in the regenerator, and the balance is removed by an additional steam superheating coil 22 located in the regenerator and governed by automatic steam control valves at 23 to maintain proper operating temperatures in the regenerator.

A desuperheating connection is shown at 24 to maintain a constant steam superheat.

The oil vapors resulting from vaporization and cracking of the feed stock pass vertically up through the fluid catalyst bed in the reactor and into cyclones 25 in the top of the reactor, which remove entrained catalyst, and the cracked products pass out at the top through an overhead line 26 to fractionating equipment.

The spent catalyst from the cracking reaction is withdrawn through a suitable stripping section indicated at 27.

The air for regeneration is shown as supplied by a turbo-compressor 28 operating through an air heater 29.

The supply of regenerated catalyst is shown as controlled by a slide valve 30 in the catalyst feed line 5, governed by a controller 31, operating in accordance with the temperature of the catalyst bed in the reactor.

Withdrawal of spent catalyst from the reactor is shown as regulated by a slide valve 32 in the drawoff line 7, governed by a level controller 33 responsive to depth of the catalyst bed in the reactor.

Thus the supply of catalyst is controlled to maintain the desired reactor temperatures and the quantity of catalyst in the reactor is controlled to maintain the desired catalytic cracking condition.

In the regenerator illustrated the spent catalyst enters at the bottom, suspended in regeneration air, flows upwardly therein and discharges at the top, suspended in the gaseous products of regeneration, with no separation of the catalyst from the gases, as distinct from bottom drawoff type regenerators wherein essentially complete separation of catalyst from gases is effected in the regenerator by hindered settling. As a consequence the permissible gas velocity is considerably greater than in bottom drawoff type regenerators, permitting reduction of cross sectional area of the regenerator on the order of 60% to 70%, as compared with bottom drawoff regenerators. This enables very appreciable reductions in size and cost of regenerator equipment.

By including the hot hopper as an integral part of the circulating catalyst system, the capacity of this vessel is utilized for (a) taking up the fluctuations in the rate of catalyst circulation and changes in the reactor bed depth and (b) collecting and holding of the catalyst in the system for shutdown purposes, enabling shutdown and startup to be quickly accomplished by closing and opening valve 30.

The hot hopper, by reason of its height, provides the required elevated support for the separator cyclones 9 and the height necessary for buildup of pressure in the regenerated catalyst standpipe to balance the pressure on the body of catalyst in the hot hopper maintained by control valves 15 and 17.

The ability to control the pressure in the supply connection 5 by means of valves 15 and 17 permits reducing the pressure drop across the slide valve 30, thus to reduce erosion on this valve and very appreciably increase the onstream time.

Provision of the heat removal coils within the regenerator results in (a) elimination of the usual feed oil preheater and (b) elimination of the external catalyst cooler heretofore required.

The elimination of the requirement for an external catalyst cooler permits locating the regenerator substantially at grade instead of at the approximately 110 foot elevation customary in existing fluid catalyst cracking systems, enabling very material savings in the costs of initial construction and subsequent maintenance.

By preheating the oil feed in the regenerator heat removal coil, the amount of hot catalyst required to give the desired reactor temperature is reduced. This reduction in the catalyst to oil ratio is desirable for the following reasons:

(a) Reduction in the deactivation of the catalyst by steam stripping of the spent catalyst from the reactor, which reduces the amount of makeup of fresh catalyst necessary to maintain the desired catalyst activity and reduction of this appreciable item of operating cost;

(b) Reductions in the size and cost of piping, valves and expansion joints necessary to carry the catalyst in the system.

Provision of the steam superheater coil within the regenerator enables elimination of the separately fired superheater generally used in other systems to superheat the steam generated within the unit.

The compactness of arrangement, the close connection of the several items of the unit and location at grade level provide for considerable savings in cost and time of construction.

While generally essential portions of a complete fluid catalyst cracking unit are illustrated, it will be realized that additional valves and accessories will be provided where necessary. In addition to the valves described, a regulating and shutoff valve is shown at 34 in the air supply line 35, and a valve 36 is shown in the oil feed line 13, the latter to be closed in conjunction with the closing of the regenerated catalyst feed valve 30 when the unit is to be shut down.

In shutting down the unit the spent catalyst drawoff valve 32 may be left open to complete transfer of the spent catalyst in the regeneration and carrier air back to the regenerator and from there into the top of the hot hopper.

An upper level is indicated in the hot hopper at 37 showing how the catalyst content of the unit may accumulate in the catalyst collecting phase of operation, as distinguished from the normal low level indicated at 38 for the continuous flow cracking and regeneration cycle.

The length of the standpipe is governed by the height of the hot hopper. The height of this hopper is determined by the inventory of catalyst in the system.

With the available height of standpipe thus limited by practical considerations, pressure in addition to that provided by the standpipe buildup may be required to counter-balance the pressure on the catalyst in the hopper. Such additional pressure is provided in the illustration by an automatic back pressure valve 39 in the flue gas discharge line, set to maintain such required additional pressure.

When catalyst is being collected and held in the hot hopper, as when valve 30 is closed, pressure on catalyst in the hopper may be relieved, in the illustration, back into the regenerated fluid catalyst line 3 as by closing valve 15 and opening valve 17.

While here illustrated as a hydrocarbon cracking process, it will be realized that the invention is of broader scope and adaptable to other heat transfer and chemical reactions.

I claim:

1. The herein disclosed process of fluid catalytic treatment comprising flashing an oil feed stock in finely divided hot catalyst and flowing same as a fluid suspension upwardly in a conversion zone, removing oil vapors from the top of said conversion zone and withdrawing spent catalyst from the bottom of said conversion zone, combining combustion supporting gas with the spent catalyst withdrawn from the bottom of the conversion zone and passing the same in fluid suspended state upwardly into the bottom of a vertically extended regenerating zone, removing regenerated catalyst suspended in the gases of regeneration from the top of the regenerating zone, separating regenerated catalyst from the gases of regeneration and delivering the regenerated catalyst in a confined, vertically elongated column downwardly into the bottom of a surrounding vertically extended enclosing holder, superimposing pressure on the catalyst collecting in the holder about the confined column and releasing the gases of regeneration under controlled back pressure to combine with the static pressure in the confined column to balance the superimposed pressure on the catalyst collecting in the surrounding holder and feeding regenerated hot catalyst from the bottom of the holder under such balanced pressures and at greater than the gases of regeneration pressure into contacting relation with the oil to be vaporized.

2. The herein disclosed process of fluid catalytic treatment comprising flashing an oil feed stock in finely divided hot catalyst and flowing same as a fluid suspension upwardly in a conversion zone, removing oil vapors from the top of said conversion zone and withdrawing spent catalyst from the bottom of said conversion zone, combining combustion supporting gas with the spent catalyst withdrawn from the bottom of the conversion zone and passing the same in fluid suspended state upwardly into the bottom of a vertically extended regenerating zone, removing regenerated catalyst suspended in the gases of regeneration from the top of the regenerating zone, separating regenerated catalyst from the gases of regeneration and delivering the regenerated catalyst in a confined, vertically elongated column downwardly into the bottom of a surrounding vertically extended enclosing holder, superimposing pressure on the catalyst collecting in the holder about the confined column and releasing the gases of regeneration under controlled back pressure to combine with the static pressure in the confined column to balance the superimposed pressure on the catalyst collecting in the surrounding holder and feeding regenerated hot catalyst from the bottom of the holder under such balanced pressures and at greater than the gases of regeneration pressure into contacting relation with the oil to be vaporized and controlling the temperature of regeneration by circulating feed stock through one portion of the regenerating zone to preheat the same and effecting a controlled circulation of steam for superheating purposes through another portion of the regenerating zone.

3. The herein disclosed process of fluid catalytic treatment comprising flashing an oil feed stock in finely divided hot catalyst and flowing same as a fluid suspension upwardly in a conversion zone, removing oil vapors from the top of said conversion zone and withdrawing spent catalyst from the bottom of said conversion zone, combining combustion supporting gas with the spent catalyst withdrawn from the bottom of the conversion zone and passing the same in fluid suspended state upwardly into the bottom of a vertically extended regenerating zone, removing regenerated catalyst suspended in the gases of regeneration fom the top of the regenerating zone, separating regenerated catalyst from the gases of regeneration and delivering the regenerated catalyst in a confined, vertically elongated column downwardly into the bottom of a surrounding vertically extended enclosing holder, superimposing pressure on the catalyst collecting in the holder about the confined column and releasing the gases of regeneration under controlled back pressure to combine with the static pressure in the confined column to balance the superimposed pressure on the catalyst collecting in the surrounding holder and feeding regenerated hot catalyst from the bottom of the holder under such balanced pressures and at greater than the gases of regeneration pressure into contacting relation with the oil to be vaporized and controlling the temperature of regeneration by circulating a controlled flow of catalyst cooling fluid through the regenerating zone.

EDWARD M. VAN DORNICK.

REFERENCES CITED

The following references are of record in the file of this patent:

UNITED STATES PATENTS

| Number | Name | Date |
| --- | --- | --- |
| 2,231,231 | Subkow | Feb. 11, 1941 |
| 2,253,486 | Belchetz | Aug. 19, 1941 |
| 2,348,699 | Tuttle | May 9, 1944 |
| 2,376,190 | Roetheli et al. | May 15, 1945 |
| 2,382,755 | Tyson | Aug. 14, 1945 |
| 2,383,636 | Wurth | Aug. 28, 1945 |
| 2,391,334 | Nicholson | Dec. 18, 1945 |
| 2,393,554 | Ogorzaly | Jan. 22, 1946 |
| 2,409,751 | Gerhold et al. | Oct. 22, 1946 |